US012689890B2

(12) United States Patent
Venkataramaiah et al.

(10) Patent No.: US 12,689,890 B2
(45) Date of Patent: Jul. 21, 2026

(54) DISTRIBUTED COORDINATION OF DUPLICATE IP ADDRESS DETECTION

(71) Applicant: Ruckus IP Holdings LLC, Horsham, PA (US)

(72) Inventors: Srinivasulu Venkataramaiah, Bengaluru (IN); Hemant Bhatnagar, Cupertino, CA (US); Sanjay Singh Pingal, Bengaluru (IN); Vivek Kumar Sharma, San Jose, CA (US); K S Keshava Murthy, Bengaluru (IN); Sudhakar Swaminathan, San Jose, CA (US); Sundeep Singatwaria, Fremont, CA (US); Ning Shen, Cupertino, CA (US)

(73) Assignee: Ruckus IP Holdings LLC, Horsham, PA (US)

( * ) Notice: Subject to any disclaimer, the term of this patent is extended or adjusted under 35 U.S.C. 154(b) by 756 days.

(21) Appl. No.: 18/007,093

(22) PCT Filed: Aug. 2, 2021

(86) PCT No.: PCT/US2021/044137
§ 371 (c)(1),
(2) Date: Jan. 27, 2023

(87) PCT Pub. No.: WO2022/031575
PCT Pub. Date: Feb. 10, 2022

(65) Prior Publication Data
US 2023/0247419 A1     Aug. 3, 2023

(30) Foreign Application Priority Data

Aug. 3, 2020    (IN) .............................. 202031033252

(51) Int. Cl.
*H04W 8/26* (2009.01)
*H04W 8/00* (2009.01)
*H04W 40/24* (2009.01)

(52) U.S. Cl.
CPC ............. *H04W 8/26* (2013.01); *H04W 8/005* (2013.01); *H04W 40/246* (2013.01)

(58) Field of Classification Search
CPC ...... H04W 8/26; H04W 8/005; H04W 40/246
(Continued)

(56) References Cited

U.S. PATENT DOCUMENTS 5,592,607 A *    1/1997    Weber ................ G06V 30/1444
                                                    715/863
7,076,767 B1 *    7/2006    Williams ............ G06F 11/3636
                                                    717/127

(Continued)

FOREIGN PATENT DOCUMENTS

WO       2020152691 A1     7/2020

OTHER PUBLICATIONS

International Search Report and Written Opinion of the International Searching Authority, International Application No. PCT/US2021/044137, Nov. 15, 2021, 15 pp.

*Primary Examiner* — April G Gonzales
(74) *Attorney, Agent, or Firm* — Myers Bigel, P.A.

(57)       ABSTRACT
An access point that detects a duplicate address is described. During operation, the access point may receive a request associated with an electronic device, where the request includes an address of the electronic device (such as an IP address). In response, the access point may perform a comparison of the address to stored addresses of one or more electronic devices that are associated with the access point. When the comparison indicates that the address is in use by another electronic device in the one or more electronic
(Continued)

devices, the access point may provide a response addressed to the electronic device that indicates that the address is in use. Otherwise, the access point may check with a remainder of a network to see if the address is in use. If the address is in use, the access point may provide the response.

17 Claims, 4 Drawing Sheets

(58) Field of Classification Search
USPC .......................................................... 455/73
See application file for complete search history.

(56) References Cited

U.S. PATENT DOCUMENTS

| | | | | |
|---|---|---|---|---|
| 7,979,382 | B2 * | 7/2011 | Guyan | .................... G06Q 40/08 |
| 8,111,643 | B2 * | 2/2012 | Kurita | ................... H04W 48/06 |
| | | | | 370/312 |
| 9,160,706 | B2 * | 10/2015 | Scahill | ................ H04L 61/4557 |
| 10,911,292 | B1 * | 2/2021 | Bshara | .................... H04L 67/61 |
| 11,461,236 | B2 * | 10/2022 | Bhoria | ................... G06F 12/128 |
| 2003/0076830 | A1 * | 4/2003 | Asano | ..................... H04L 61/25 |
| | | | | 370/392 |
| 2005/0036471 | A1 * | 2/2005 | Singh | .................. H04L 61/5092 |
| | | | | 370/389 |
| 2008/0025253 | A1 * | 1/2008 | Choi | ................... H04L 61/5076 |
| | | | | 370/328 |
| 2009/0149222 | A1 * | 6/2009 | Takakura | ................ H04W 8/02 |
| | | | | 455/561 |
| 2011/0103344 | A1 * | 5/2011 | Gundavelli | ........... H04W 8/005 |
| | | | | 370/331 |
| 2012/0224576 | A1 * | 9/2012 | Gu | .......................... H04L 61/59 |
| | | | | 370/390 |
| 2013/0303085 | A1 * | 11/2013 | Boucher | ............. H04W 12/069 |
| | | | | 455/41.1 |
| 2014/0101304 | A1 * | 4/2014 | Webster | ................. H04L 67/02 |
| | | | | 709/224 |
| 2016/0226761 | A1 * | 8/2016 | Hui | ......................... H04L 45/74 |
| 2017/0171729 | A1 * | 6/2017 | Fox | .................... H04L 61/4588 |
| 2018/0331946 | A1 * | 11/2018 | Olofsson | ................ H04L 45/22 |
| 2021/0119828 | A1 * | 4/2021 | Thomas | ............... H04L 47/125 |
| 2025/0203495 | A1 * | 6/2025 | Bagur | ............... H04W 74/0858 |

* cited by examiner

DISTRIBUTED COORDINATION OF DUPLICATE IP ADDRESS DETECTION

CROSS-REFERENCE TO RELATED APPLICATIONS

The present application is a 35 U.S.C. § 371 national stage application of PCT Application No. PCT/US2021/044137, filed on Aug. 2, 2021, which itself claims priority to Indian Patent Application number 202031033252, filed Aug. 3, 2020, the disclosures of both of which are hereby incorporated herein in their entireties as if set forth fully herein.

BACKGROUND

Field

The described embodiments relate to techniques for detecting a duplicate address. Notably, the described embodiments relate to techniques for detecting a duplicate address in a wireless network.

Related Art

Many electronic devices are capable of wirelessly communicating with other electronic devices. For example, these electronic devices can include a networking subsystem that implements a network interface for a wireless local area network (WLAN), e.g., a wireless network such as described in the Institute of Electrical and Electronics Engineers (IEEE) 802.11 standard (which is sometimes referred to as 'Wi-Fi'). For example, a wireless network may include an access point that communicates wirelessly with one or more associated electronic devices (which are sometimes referred to as 'clients').

Moreover, electronic devices typically communicate with a wired network (such as the Internet) via access points in WLANs. For example, an electronic device may access the Internet by wireless communication with an access point using Wi-Fi.

Furthermore, in order to access the Internet, an electronic device typically is assigned an Internet Protocol (IP) address. For example, an electronic device may request and then receive an IP address from a dynamic host configuration protocol (DHCP) server. However, in high-density environments or deployments, the DHCP server can become a bottleneck in this approach, which can reduce the communication performance of a network.

Consequently, in recent approaches, a network operator may allow the electronic devices to assign their own IP addresses. For example, an IP version 6 (IPv6)-compatible electronic device may automatically assign itself an IP address. This electronic device may then check or confirm that the selected IP address is unique (i.e., that a duplicate IP address is not already assigned to another electronic device in the network) by sending a multicast packet with a multicast group address as the destination address. An access point that receives the multicast packet may then forward it, e.g., to a switch in a network, which then forwards the multicast packet to other access points in the network and, ultimately, to other electronic devices in the network. In high-density deployments, this additional management traffic can degrade the communication performance of the network, which is frustrating to users.

SUMMARY

A first group of embodiments relate to an access point that detects a duplicate address. This access point may include:

an antenna node, a network node; and one or more interface circuits that communicate with an electronic device and/or a network device in a network. During operation, the access point may receive, at the antenna node, a request associated with the electronic device, where the request includes an address of the electronic device. In response, the access point may perform a comparison of the address to stored addresses of one or more electronic devices that are associated with the access point. When the comparison indicates that the address is in use by another electronic device in the one or more electronic devices, the access point may provide, from the antenna node, a response addressed to the electronic device that indicates that the address is in use.

Alternatively, when the comparison indicates that the address is not in use by the one or more electronic devices, the access point may provide, from the network node, a second request addressed to the network device, where the second request includes the address. Then, the access point may receive, at the network node, a second response associated with the network device. When the second response indicates that the address is not in use in a remainder of the network, the access point may store the address and an association with the electronic device. Otherwise, when the second response indicates that the address is in use, the access point may provide, from the antenna node, the response.

In some embodiments, when the access point does not receive a second response to the second request within a time interval (such as, e.g., 10 s, 30 s, or 1 min), the access point may store the address and the association with the electronic device.

Note that the address may include an IP address, such as an IPv6 address. This IP address may be assigned by the electronic device.

Moreover, the request and the response may be compatible with a neighbor discovery (ND) protocol. For example, the request may be a neighbor solicitation (NS) request, and the response may be a neighbor advertisement (NA) response.

Furthermore, the network device may include another access point or a switch in the network.

In some embodiments, the access point may receive, at the network node, a third request associated with the network device, where the third request includes a second address. In response, the access point may perform a second comparison of the second address with the stored addresses. Next, the access point may provide, from the network node, a third response addressed to the network device that indicates whether the second address is in use or not based at least in part on the second comparison.

Another embodiment provides a computer-readable storage medium for use with the access point. When executed by the access point, this computer-readable storage medium causes the access point to perform at least some of the aforementioned operations.

Another embodiment provides a method, which may be performed by the access point. This method includes at least some of the aforementioned operations.

A second group of embodiments relate to a first network device that detects a duplicate address. This first network device may include: an antenna node, a network node; and one or more interface circuits that communicate with an electronic device and/or a network device in a network. During operation, the first network device of a wireless network may receive receiving a request, where the request is associated with the electronic device and includes a request to join the wireless network, and the request includes an address for the electronic device that was self-assigned by the electronic device. Then, in response to receiving the request, the first network device performs a comparison of the address to stored addresses of one or more electronic devices that are connected to the wireless network. When the comparison indicates that the address is in use by another electronic device in the one or more electronic devices, the first network device provides a response addressed to the electronic device that indicates that the address is in use.

Note that the first network device may include an access point.

Moreover, when the comparison indicates that the address is not in use by the one or more electronic devices, the first network device may provide a second request addressed to a network device, where the second request includes the address. Furthermore, when the first network device does not receive a second response to the second request within a time interval, the first network device may store the address and an association with the electronic device. Alternatively or additionally, the first network device may: receive a second response associated with the network device; and when the second response indicates that the address is in use, provide the response addressed to the electronic device.

In some embodiments, the first network device may include a network controller.

Moreover, the first network device may aggregate the stored addresses of one or more electronic devices that are stored by the first network device or another first network device (such as an access point) with multiple additional stored addresses of additional electronic devices that are stored at multiple additional first network devices (such as multiple access points). Alternatively or additionally, the first network device may: aggregate the stored addresses of one or more electronic devices that are stored by the first network device or the other first network device with multiple additional stored addresses of additional electronic devices that are stored at the other first network device and/or multiple additional first network devices (such as multiple access points) in a data structure. Furthermore, the first network device may distribute the stored addresses of one or more electronic devices, the other first network device and/or the multiple additional stored addresses of additional electronic devices that are stored at the other first network device and/or the multiple additional first network device that are stored in the data structure to the other first network device and/or the multiple additional first network devices.

Another embodiment provides a computer-readable storage medium for use with the first network device. When executed by the first network device, this computer-readable storage medium causes the first network device to perform at least some of the aforementioned operations.

Another embodiment provides a method, which may be performed by the first network device. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An access point that detects a duplicate address is described. During operation, the access point may receive a request associated with an electronic device, where the request includes an address of the electronic device (such as an IP address). In response, the access point may perform a comparison of the address to stored addresses of one or more electronic devices that are associated with the access point. When the comparison indicates that the address is in use by another electronic device in the one or more electronic devices, the access point may provide a response addressed to the electronic device that indicates that the address is in use.

Otherwise, the access point may check with a remainder of a network to see if the address is in use. If the address is in use, the access point may provide the response. Alternatively, when the address is not in use, the access point may store the address and an association with the electronic device, and may provide an additional response addressed to the electronic device that indicates that the address is not in use.

By locally detecting whether the address is a duplicate address, these communication techniques may reduce management traffic in the network. Notably, multiple requests may not need to be communicated throughout the network. Consequently, the communication techniques may reduce overhead and, thus, may improve the communication performance of the network (such as the throughput). In turn, these capabilities may improve the user experience and satisfaction when using the electronic device, the access point and/or the network.

In the discussion that follows, an electronic device and an access point may communicate packets in accordance with a wireless communication protocol, such as an Institute of Electrical and Electronics Engineers (IEEE) 802.11 standard (which is sometimes referred to as 'Wi-Fi,' from the Wi-Fi Alliance of Austin, Texas), Bluetooth (from the Bluetooth Special Interest Group of Kirkland, Washington), and/or another type of wireless interface. In the discussion that follows, Wi-Fi is used as an illustrative example. However, a wide variety of communication protocols (such as Long Term Evolution or LTE, another cellular-telephone communication protocol, etc.) may be used.

Moreover, the access point may communicate with other access points and/or computers in a network using a wired communication protocol, such as an IEEE 802.3 standard (which is sometimes referred to as 'Ethernet') and/or another type of wired interface. In the discussion that follows, Ethernet is used as an illustrative example.

Figure 1:
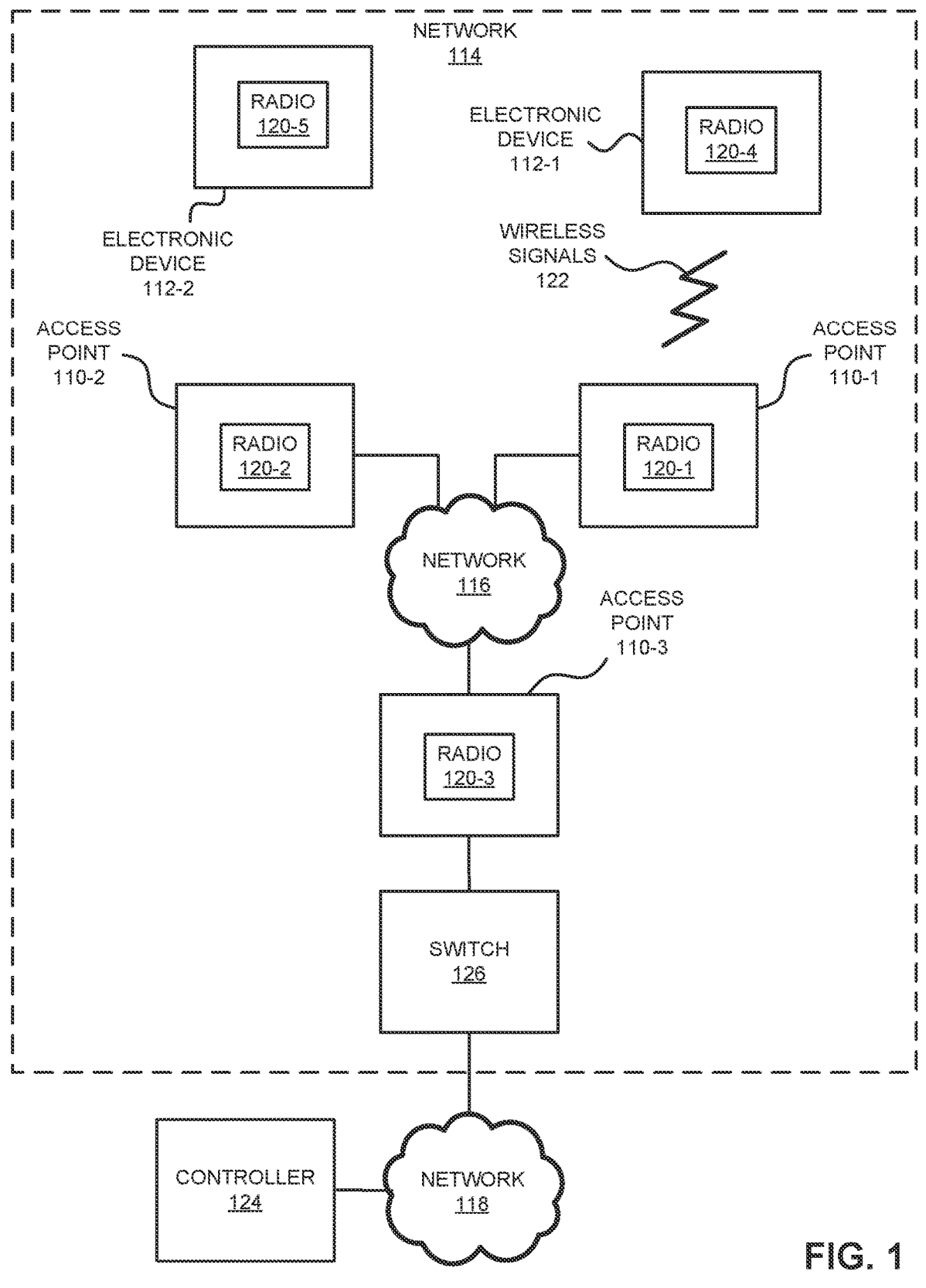
FIG. 1 is a block diagram illustrating an example of electronic devices wirelessly communicating in accordance with an embodiment of the present disclosure.

FIG. 1 presents a block diagram illustrating an example of communication among one or more access points 110 and electronic devices 112 (such as a cellular telephone, and which are sometimes referred to as 'clients') in a network 114 in accordance with some embodiments. Notably, access points 110 may communicate with each other in network 114 using wireless and/or wired communication. Moreover, at least one of access points 110 (such as access point 110-3) may communicate with switch 126 (such as an Ethernet switch) using wired communication. This switch may provide access to a network 118 (such as the Internet, a cable network, a cellular-telephone network, etc.) that is external to network 114 (such as an Ethernet switch). Note that access points 110 may communicate with a controller 124 (such as a cloud-based controller that configures and manages access points 110) via network 118. Furthermore, at least some of access points 110 (such as access point 110-1 and access point 110-2) may communicate with electronic devices 112 using wireless communication. Note that access points 110 may include a physical access point and/or a virtual access point that is implemented in software in an environment of an electronic device or a computer.

The wired and/or wireless communication among access points 110 in WLAN 114 may occur via network 116 (such as an intra-net, a mesh network, point-to-point connections and/or the Internet) and may use a network communication protocol, such as Ethernet. This network may include one or more routers and/or additional switches (not shown). Furthermore, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, the wired and/or wireless communication among access points 110 also involves the use of dedicated connections, such as via a peer-to-peer (P2P) communication technique.

Figure 4:
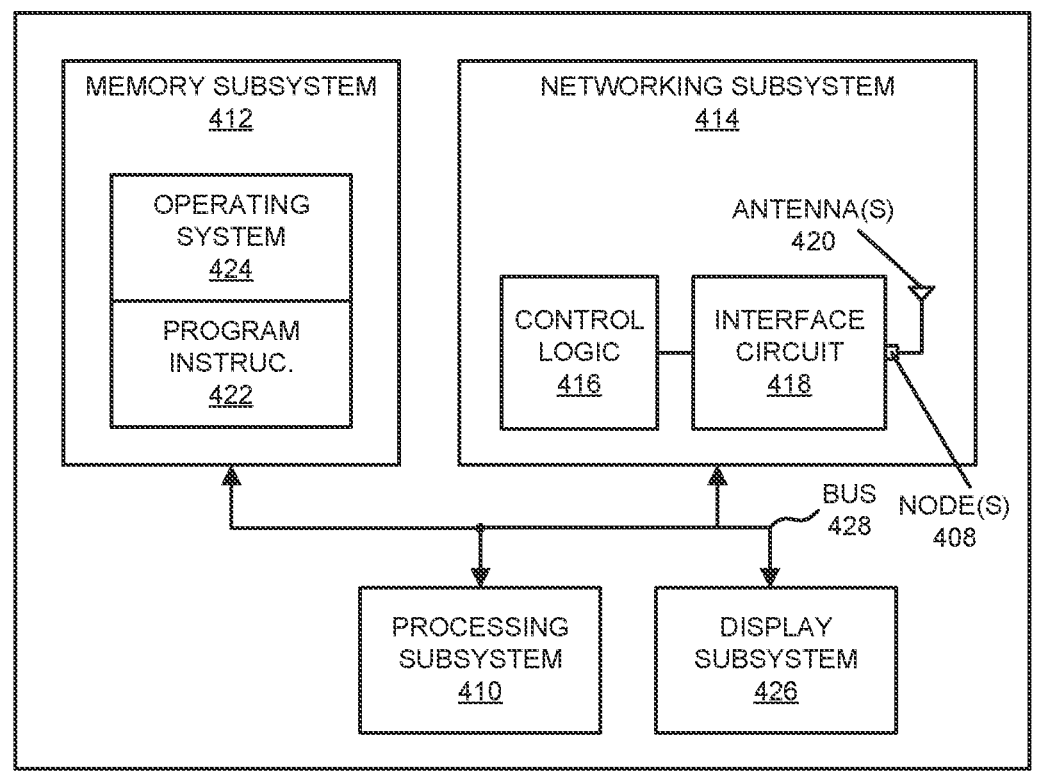
FIG. 4 is a block diagram illustrating one of the electronic devices of FIG. 1 in accordance with an embodiment of the present disclosure.

As described further below with reference to FIG. 4, access points 110 and/or electronic devices 112 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120.

As can be seen in FIG. 1, wireless signals 122 (represented by a jagged line) are transmitted from radio 120-1 in access point 110-1. These wireless signals may be received by radio 120-4 in electronic device 112-1. Notably, access point 110-1 may transmit packets. In turn, these packets may be received by electronic device 112-1. Moreover, access point 110-1 may allow electronic device 112-1 to communicate with other electronic devices, computers, servers, access points, routers or switches via networks 116 and/or 118.

Note that the communication among access points 110 and/or with electronic devices 112 may be characterized by a variety of performance metrics (which are sometimes referred to as 'communication performance metrics'), such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, an SNR, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or a frame in access points 110 and electronic devices 112 includes: receiving signals (such as wireless signals 122) with the packet or the frame; decoding/extracting the packet or the frame from received wireless signals 122 to acquire the packet or the frame; and processing the packet or the frame to determine information contained in the packet or the frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, a network operator of network 114 may allow electronic devices 112 (such as electronic devices that are compatible with IPv6) to use an auto address configuration service. This capability may allow an electronic device (such as electronic device 112-1) to automatically select its own IP address in network 114. However, in order to prevent the inadvertent selection of a duplicate IP address, electronic device 112 may broadcast a multicast packet with a multicast group address as the destination address. In response to receiving such a multicast packet, access point 110-1 may forward the multicast packet to a network device in network 114, such as access point 110-3. Then, access point 110-3 may provide the multicast packet to switch 126, which may provide the multicast packet to the remaining access points 110 in network 114 (e.g., to the connected ports on switch 126). Next, the remaining access points 110 may provide the multicast packet to the other electronic devices 112 that are associated with these access points. These other electronic devices 112 may determine whether the IP address selected by electronic device 110-1 is in use (or not), and then they may report back to electronic device 112-1. Needless to say, in a high-density environment or deployment, this approach involves considerable management traffic, which can degrade the communication performance (such as the throughput) in network 114.

Figure 2:
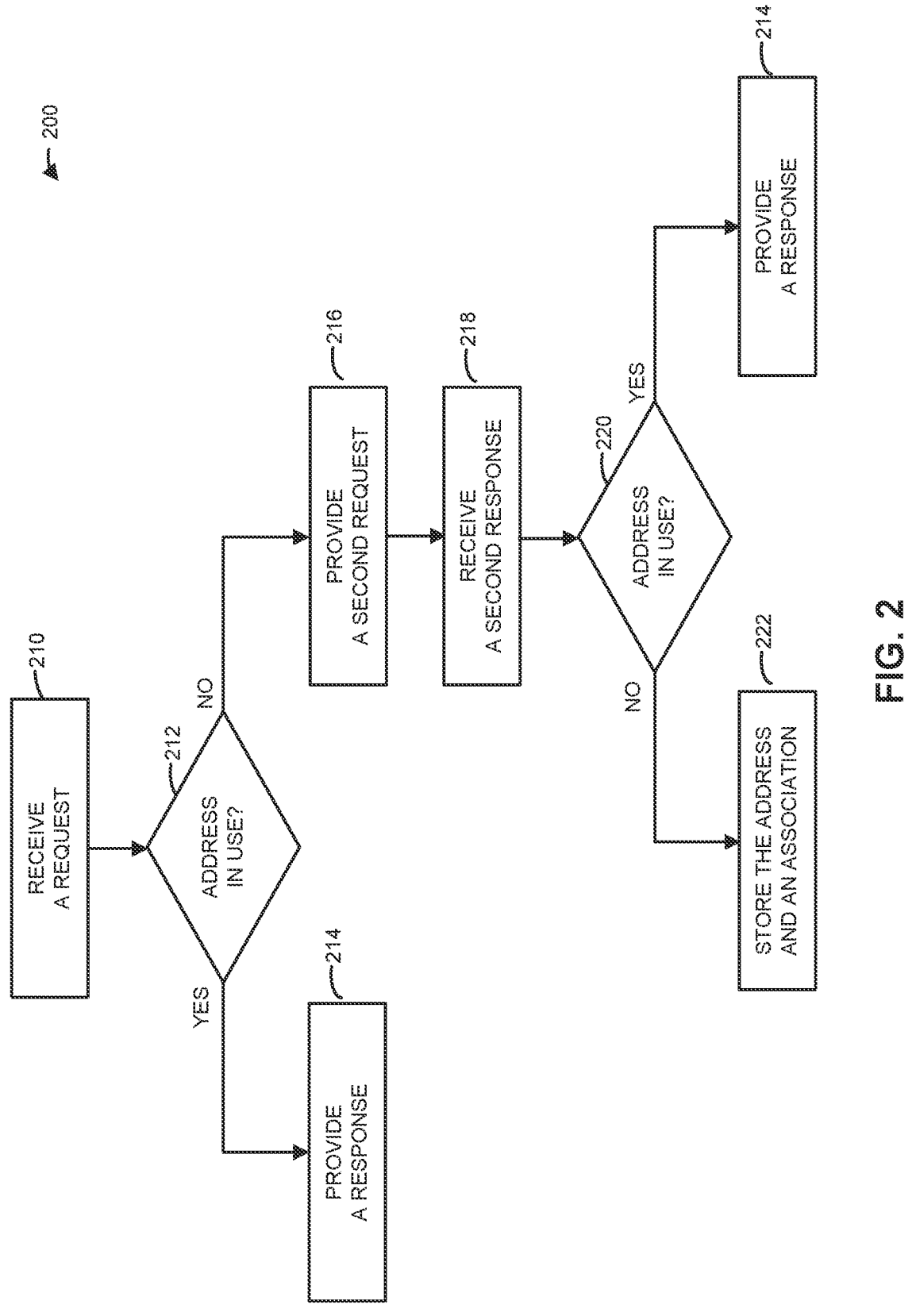
FIG. 2 is a flow diagram illustrating a method for detecting a duplicate address in accordance with an embodiment of the present disclosure.

As discussed further below with reference to FIGS. 2 and 3, in order to address this problem, access points 110 (such as access point 110-1) may locally perform duplicate IP address checks or detection for their associated (e.g., connected) electronic devices 112 and may respond to requests related to IP addresses from elsewhere in network 114 on behalf of their associated electronic devices 112. In this way, access points 110 may reduce the management traffic associated with duplicate IP address detection (and, thus, may improve the communication performance) in network 114.

Notably, in response to a request from electronic device 112-1 (such as an NS request) with an IP address (such as a candidate or proposed IP address for electronic device 112-1), access point 110-1 may perform a comparison of the IP address to stored IP addresses of one or more electronic devices 112 that are associated with access point 110-1. For example, access point 110-1 may access a data structure or a look-up table in memory to access the stored IP addresses. When the comparison indicates that the IP address is in use by another electronic device in the one or more electronic devices, access point 110-1 may provide a response to electronic device 112-1 (such as an NA response) that indicates that the IP address is in use, so electronic device can select another IP address.

Alternatively, when the comparison indicates that the IP address is not in use by the one or more electronic devices 112, access point 110-1 may provide a second request to a network device in network 114 (such as access point 110-3 or switch 126) with the IP address. This second request may be forwarded by switch 126 to the remaining access points 110 in network 114, which may perform their own local duplicate IP address checks or detection (i.e., comparisons) using stored IP addresses of one or more electronic devices 112 that are associated with these remaining access points 110. Then, the remaining access points 110 may provide second responses that indicate whether or not the IP address is in use. These second responses may be aggregated by switch 126, which may provide a single second response to access point 110-1. Alternatively, switch 126 may provide the individual second responses from the remaining access points 110 to access point 110-1.

When the one or more second response(s) indicate that the IP address is not in use in a remainder of network 114, access point 110-1 may store the IP address and an association with electronic device 112-1. For example, access point 110-1 may store the IP address in the data structure or the look-up table in memory. Otherwise, when the one or more second responses indicate that the IP address is in use, access point 110-1 may provide the response to electronic device 112-1, so electronic device can select another IP address.

In some embodiments, access point 110-1 may receive a third request associated with the network device (which may be, for example, another access point, such as access point 110-2 or switch 126), where the third request includes a second IP address. For example electronic device 112-2 may have selected the second IP address. After confirming that, locally, this IP address is not in use, access point 110-2 may have forwarded it to the remaining access points 110 in network 114. In response to the third request, access point 110-1 may perform another comparison of the second IP address with the stored IP addresses. Next, access point 110-1 may provide a third response to the network device that indicates whether the second IP address is in use or not based at least in part on the other comparison. Note that switch 126 may either aggregate other third responses for this second IP address or may provide the individual third responses to access point 110-2. In this way, access point 110-1 may handle requests for duplicate IP address checks or detection on behalf of the one or more electronic devices 112 that are associated with access point 110-1.

We now describe embodiments of the method. FIG. 2 presents a flow diagram illustrating an example of a method

200 for detecting a duplicate address that may be performed by the access point (such as access point 110-1 in FIG. 1) according to some embodiments. During operation, the access point may receive a request (operation 210) associated with an electronic device, where the request includes an address of the electronic device. For example, the address may include an IP address, such as an IPv6 address. This IP address may be assigned by the electronic device.

In response, the access point may perform a comparison (operation 212) of the address to stored addresses of one or more electronic devices that are associated with the access point. When the comparison (operation 212) indicates that the address is in use by another electronic device in the one or more electronic devices, the access point may provide a response (operation 214) addressed to the electronic device that indicates that the address is in use. Note that the request and the response may be compatible with an ND protocol. For example, the request may be an NS request, and the response may be an NA response.

Alternatively, when the comparison (operation 212) indicates that the address is not in use by the one or more electronic devices, the access point may provide a second request (operation 216) addressed to a network device (which may be, for example, another access point or a switch in a network), where the second request includes the address. Then, the access point may receive a second response (operation 218) associated with the network device. When the second response indicates that the address is not in use (operation 220) in a remainder of the network, the access point may store the address and an association (operation 222) with the electronic device. Otherwise, when the second response indicates that the address is in use (operation 220), the access point may provide the response (operation 224) to the electronic device.

In some embodiments, the access point may perform one or more optional additional operations. Notably, the access point may receive a third request associated with the network device, where the third request includes a second address. In response, the access point may perform a second comparison of the second address with the stored addresses. Next, the access point may provide a third response addressed to the network device that indicates whether the second address is in use or not based at least in part on the second comparison.

In some embodiments of method 200, there may be additional or fewer operations. Moreover, the order of the operations may be changed, and/or two or more operations may be combined into a single operation. For example, in some embodiments, the access point may not receive the second response (operation 216) when the address is not in use in the remainder of the network. Instead, the second response may only be received when there is a duplicate address detected. Consequently, in these embodiments, when the access point does not receive the second response after, for example, a predetermined time period, the access point may perform operation 220.

Moreover, while the preceding discussion illustrated the communication techniques with separate (local) data structures stored in access points in the network with the (local) addresses and associated electronic devices, in other embodiments this information may be stored remotely (such as in a controller). Alternatively or additionally, at least some of the operations in method 200 may be performed by the controller. For example, the controller may perform the comparisons and may provide the responses, as needed. In some embodiments, the controller may aggregate the local data structures from the access points, and may distribute a global data structure with the addresses and the associated electronic devices in the network. In these embodiments, the access points may be able to locally perform the comparisons for the whole network or the access points may forward requests to the controller. Furthermore, when a new address is identified by an access point, it may forward this information to the controller so that the controller can update the global data structure for the network.

Figure 3:
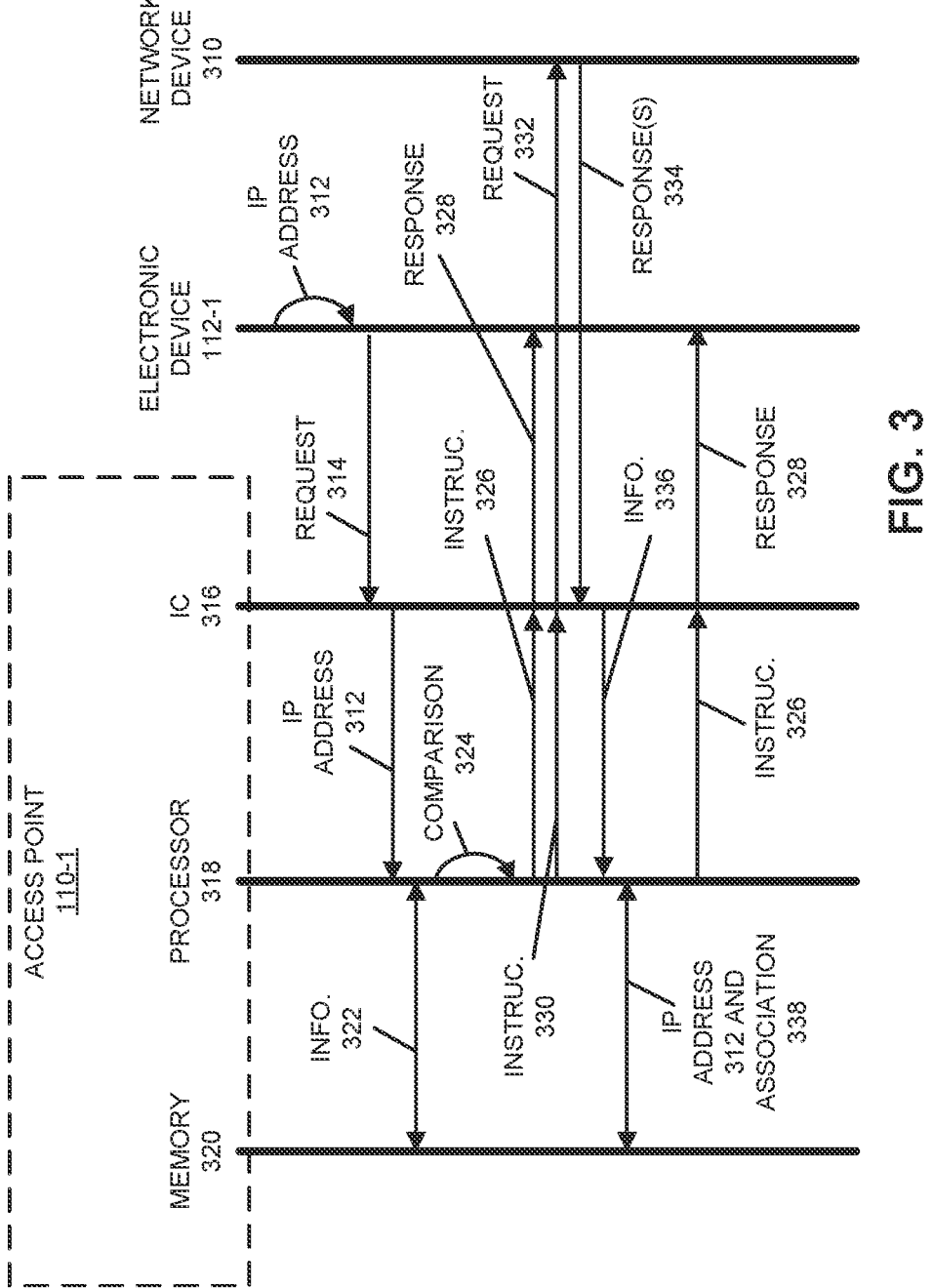
FIG. 3 is a drawing illustrating communication among the electronic devices in FIG. 1 in accordance with an embodiment of the present disclosure.

Embodiments of the communication technique are further illustrated in FIG. 3, which presents a drawing illustrating an example of communication between access point 110-1, electronic device 112-1 and network device 310 (such as access point 110-3 or switch 126 in FIG. 1) according to some embodiments. Electronic device 112-1 may select an IP address 312. Then, electronic device 112-1 may provide a request 314 with IP address 312 to access point 110-1.

After receiving request 314, an interface circuit (IC) 316 in access point 110-1 may provide IP address 312 to a processor 318 in access point 110-1. Processor 318 may access, in memory 320 in access point 110-1, information 322 specifying IP addresses of one or more electronic devices that are associated with access point 110-1. Then, processor 110-1 may perform a comparison 324 of IP address 312 and the IP addresses.

When comparison 324 indicates that IP address 312 is in use by another electronic device in the one or more electronic devices, processor 318 may instruct 326 interface circuit 316 to provide a response 328 to electronic device 112-1 that indicates that IP address 312 is in use.

Alternatively, when comparison 324 indicates that IP address 312 is not in use by the one or more electronic devices, processor 318 may instruct 330 interface circuit 316 to provide a request 332 to network device 310 with IP address 312. Network device 310 may forward request 332 to other electronic devices in a network. Subsequently, network device 310 may receive and then provide one or more responses 334 to request 332 from the other electronic devices in the network to access point 110-1.

After receiving the one or more responses 334, interface circuit 316 may provide information 336 included in the one or more responses 334 to processor 318. When information 336 indicates that IP address 312 is not in use in a remainder of the network, processor 318 may store IP address 312 and an association 338 with electronic device 112-1 in memory 320. Otherwise, when information 336 indicates that IP address 312 is in use, processor 318 may instruct 326 interface circuit 316 to provide response 328 to electronic device 112-1 that indicates that IP address 312 is in use.

While FIG. 3 illustrates communication between components using unidirectional or bidirectional communication with lines having single arrows or double arrows, in general the communication in a given operation in this figure may involve unidirectional or bidirectional communication.

In some embodiments, for IPv6-enabled Wi-Fi client devices in a high-density Wi-Fi deployment, a network operator can provide either DHCPv6 or an auto address configuration service option from IPv6 routers for Wi-Fi clients. If an auto address configuration deployment mechanism is chosen by a wireless Internet service provider (WISP), them a Wi-Fi client may auto generate its IPv6 address. The Wi-Fi client may check the uniqueness of the auto generated IP address by sending a multicast packet using s solicited-node multicast group address as the destination address. An access point may forward this multicast packet to the Ethernet side of a network, where an AP is connected to an Ethernet Switch. Then, the Ethernet switch may forward the multicast packet to connected ports on the switch. For a high-density deployment, multiple access points may be connected to the Ethernet Switch. Consequently, other access points within this domain may receive the multicast packet from the switch. After receiving the multicast packet, these access points may forward it to their Wi-Fi clients. The multiplicative effect of the multicast packet across the access points connected to switch can exacerbate the communication-performance impact in a Wi-Fi network.

In order to address this problem, communication techniques with distributed coordination may be used. Notably, the access points may maintain data structures of locally attached IPv6 Wi-Fi client. These access points may perform comparisons of locally selected IP addresses using this data structure. If there is not a match (i.e., it appears than an IP address is not in use), the access points may forward NA requests for duplicate address detection (DAD) to an Ethernet switch, which forwards these NA requests to its connected access points. These access points may perform comparisons with their local data structures and may report back. For example, if a match for requested IP address is found, then an access point may respond back with an NA response. Note that these communication techniques may improve the communication performance in a network by, e.g., 800%.

In some embodiments, such as Wi-Fi deployments in which access points do not tunnel their traffic to a Wi-Fi controller, a IPv6-Wi-Fi-proxy solution may be used. Notably, each of the access points may maintain a data structure of their Wi-Fi clients. The data structure may be maintained using an NS message that an access point receives from IPv6-enabled Wi-Fi client. When a new IPv6-enabled Wi-Fi client joins or associates with an access point, it may send an NS message to the access point for DAD. When the NS message is received by the access point, it may check it against the data structure of Wi-Fi clients that it maintains locally. If a match is found, then the access point may proxy on behalf of a Wi-Fi client that owns the requested IPv6 address. Alternatively, if the access point does not have a match for the requested IP address, then the access point may forward the NS message to the Ethernet-switch side of the network. The Ethernet switch may forward the NS message to neighboring access points.

When the neighboring access points receive this message from the Ethernet side, each of these access points may compare the requested IP address against its local data structure of IPv6 clients that are directly connected to it. If a match is found for the target IP address requested in the received NA message, then a neighboring access point may respond back to the Ethernet side of the network. This NA message may be received be the original access point where the Wi-Fi client that requested DAD detection is connected. In this approach, the NA message forwarded in the network is a response to the NS message indicates that a match to the requested IP address was found. This approach may reduce or eliminate the multiplicative degenerative effect of wasted airtime—for example, because of a basic service set minimum management frame data rate (BSS minrate) requirement for multicast packets—and may avoid flooding the Wi-Fi medium with unnecessary management traffic.

We now describe embodiments of the electronic device. FIG. 4 presents a block diagram illustrating an electronic device 400 (such as one of access points 110, electronic devices 112 or switch 126 in FIG. 1) according to some embodiments. This electronic device includes processing subsystem 410, memory subsystem 412, and networking subsystem 414. Processing subsystem 410 includes one or more devices configured to perform computational operations. For example, processing subsystem 410 can include one or more microprocessors, application-specific integrated circuits (ASICs), microcontrollers, programmable-logic devices, one or more graphics processing units, and/or one or more digital signal processors (DSPs).

Memory subsystem 412 includes one or more devices for storing data and/or instructions for processing subsystem 410 and networking subsystem 414. For example, memory subsystem 412 can include dynamic random access memory (DRAM), static random access memory (SRAM), and/or other types of memory. In some embodiments, instructions for processing subsystem 410 in memory subsystem 412 include: one or more program modules or sets of instructions (such as program instructions 422 or operating system 424), which may be executed by processing subsystem 410. Note that the one or more computer programs may constitute a computer-program mechanism. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 410.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Networking subsystem 414 includes one or more devices configured to couple to and communicate on a wired and/or wireless network (i.e., to perform network operations), including: control logic 416, an interface circuit 418 and one or more antennas 420. (While FIG. 4 includes the one or more antennas 420, in some embodiments electronic device 400 includes one or more nodes, such as node 408, e.g., a pad, which can be coupled to the one or more antennas 420. Thus, electronic device 400 may or may not include the one or more antennas 420.) For example, networking subsystem 414 can include a Bluetooth networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi networking system), an Ethernet networking system, and/or another networking system.

Note that a transmit or receive antenna pattern (or antenna radiation pattern) of electronic device 400 may be adapted or changed using pattern shapers (such as reflectors) in one or more antennas 420 (or antenna elements), which can be independently and selectively electrically coupled to ground to steer the transmit antenna pattern in different directions. Thus, if one or more antennas 420 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 400 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 400 may use the mechanisms in networking subsystem 414 for performing simple wireless communication between the electronic devices, e.g., transmitting advertising or beacon frames and/or scanning for advertising frames transmitted by other electronic devices as described previously.

Within electronic device 400, processing subsystem 410, memory subsystem 412, and networking subsystem 414 are coupled together using bus 428. Bus 428 may include an electrical, optical, and/or electro-optical connection that the subsystems can use to communicate commands and data among one another. Although only one bus 428 is shown for clarity, different embodiments can include a different number or configuration of electrical, optical, and/or electro-optical connections among the subsystems.

In some embodiments, electronic device 400 includes a display subsystem 426 for displaying information on a display, which may include a display driver and the display, such as a liquid-crystal display, a multi-touch touchscreen, etc.

Electronic device 400 can be (or can be included in) any electronic device with at least one network interface. For example, electronic device 400 can be (or can be included in): an IoT device, a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a controller, test equipment, and/or another electronic device Although specific components are used to describe electronic device 400, in alternative embodiments, different components and/or subsystems may be present in electronic device 400. For example, electronic device 400 may include one or more additional processing subsystems 410, memory subsystems 412, networking subsystems 414, and/or display subsystems 426. Additionally, one or more of the subsystems may not be present in electronic device 400. Moreover, in some embodiments, electronic device 400 may include one or more additional subsystems that are not shown in FIG. 4. Also, although separate subsystems are shown in FIG. 4, in some embodiments, some or all of a given subsystem or component can be integrated into one or more of the other subsystems or component(s) in electronic device 400. For example, in some embodiments program instructions 422 is included in operating system 424.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 414, such as a radio. Moreover, the integrated circuit may include hardware and/or software mechanisms that are used for transmitting wireless signals from electronic device 400 and receiving signals at electronic device 400 from other electronic devices. Aside from the mechanisms herein described, radios are generally known in the art and hence are not described in detail. In general, networking subsystem 414 and/or the integrated circuit can include any number of radios. Note that the radios in multiple-radio embodiments function in a similar way to the described single-radio embodiments.

In some embodiments, networking subsystem 414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, calculating the throughput metric, etc.)

While a communication protocol compatible with Wi-Fi was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 422, operating system 424 (such as a driver for interface circuit 418) or in firmware in interface circuit 418. Alternatively or additionally, at least some of the operations in the communication technique may be implemented in a physical layer, such as hardware in interface circuit 418.

Furthermore, the functionality of electronic device 400 may be implemented using a single electronic device or a group of electronic devices, which may be located at a single location or which may be distributed at disparate geographic locations (such as a cloud-based computing system).

Additionally, while the preceding embodiments illustrated the use of wireless signals in one or more bands of frequencies, in other embodiments of these signals may be communicated in one or more bands of frequencies, including: a microwave frequency band, a radar frequency band, 900 MHz, 2.4 GHz, 5 GHz, 60 GHz, and/or a band of frequencies used by a Citizens Broadband Radio Service or by LTE. In some embodiments, the communication between electronic devices uses multi-user transmission (such as orthogonal frequency division multiple access or OFDMA).

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication or configuration techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point that is part of a WiFi network, comprising:
   an antenna node configured to couple to an antenna;
   a network node;
   one or more interface circuits configured to communicate, via the antenna node or the network node, with an electronic device, a network device in the WiFi network, or both, wherein the access point is configured to:
      receive, at the antenna node, a request associated with the electronic device, wherein the request comprises an address of the electronic device;
      in response to receiving the request, perform a comparison of the address to stored addresses of one or more additional electronic devices that are associated with the access point;
      when the comparison indicates that the address is not in use by the one or more additional electronic devices, provide, from the network node, a second request addressed to the network device, the second request comprising the address; and
      receive, at the network node, a second response associated with the network device, the second response indicating whether or not the address is in use by another electronic device that is associated with another access point in the WiFi network.

2. The access point of claim 1, wherein, when the second response indicates that the address is not in use by another electronic device that is associated with another access point in the WiFi network, the access point is configured to store the address and an association with the electronic device.

3. The access point of claim 1, wherein the address comprises an Internet Protocol (IP) address.

4. The access point of claim 1, wherein the request and the response are compatible with a neighbor discovery (ND) protocol.

5. The access point of claim 4, wherein the request comprises a neighbor solicitation (NS) request.

6. The access point of claim 1, wherein the network device comprises a switch in the network.

7. A non-transitory computer-readable storage medium for use in conjunction with an access point that is part of a WiFi network, the computer-readable storage medium storing program instructions that, when executed by the access point, causes the access point to perform operations, comprising:

receiving a request associated with an electronic device, wherein the request comprises an address of the electronic device;

in response to receiving the request, performing a comparison of the address to stored addresses of one or more additional electronic devices that are associated with the access point;

when the comparison indicates that the address is not in use by the one or more additional electronic devices, provide a second request addressed to a network device, the second request comprising the address; and receive a second response associated with the network device, the second response indicating whether or not the address is in use by another electronic device that is associated with another access point in the WiFi network.

8. The non-transitory computer-readable storage medium of claim 7, wherein the address comprises an Internet Protocol (IP) address.

9. The non-transitory computer-readable storage medium of claim 7, wherein the network device comprises a network switch.

10. The non-transitory computer-readable storage medium of claim 7, wherein, when the second response indicates that the address is not in use by another electronic device that is associated with another access point in the WiFi network, the access point is configured to store the address and an association with the electronic device.

11. The non-transitory computer-readable storage medium of claim 7, wherein the request and the response are compatible with a neighbor discovery (ND) protocol.

12. The non-transitory computer-readable storage medium of claim 11, wherein the request comprises a neighbor solicitation (NS) request.

13. A method for detecting a duplicate address, comprising:

by an access point that is part of a WiFi network:

receiving a request associated with an electronic device, wherein the request comprises an address of the electronic device;

in response to receiving the request, performing a comparison of the address to stored addresses of one or more additional electronic devices that are associated with the access point;

when the comparison indicates that the address is not in use by the one or more additional electronic devices, providing a second request addressed to a network device, the second request comprising the address; and receiving a second response associated with the network device, the second response indicating whether or not the address is in use by another electronic device that is associated with another access point in the WiFi network.

14. The method of claim 13, wherein the network device comprises a network switch.

15. The method of claim 13, wherein, when the second response indicates that the address is not in use by another electronic device that is associated with another access point in the WiFi network, the access point is configured to store the address and an association with the electronic device.

16. The method of claim 13, wherein the request and the response are compatible with a neighbor discovery (ND) protocol.

17. The method of claim 16, wherein the request comprises a neighbor solicitation (NS) request.

* * * * *